April 24, 1962

D. B. SERGAY 3,031,180

SELF-LEVELING FLUID SPRING

Filed Sept. 15, 1960

INVENTOR.
Dimitry B. Sergay
BY
W. F. Wagner
ATTORNEY

United States Patent Office 3,031,180
Patented Apr. 24, 1962

3,031,180
SELF-LEVELING FLUID SPRING
Dimitry B. Sergay, Clawson, Mich., assignor to General Motors Corporation, Detroit, Mich., a corporation of Delaware
Filed Sept. 15, 1960, Ser. No. 56,204
10 Claims. (Cl. 267—34)

This invention relates to vehicle suspension and more particularly to self-leveling fluid springs for vehicle suspension.

An object of the invention is to provide an improved and simplified fluid spring.

Another object is to provide a vehicle suspension incorporating a simplified self-leveling fluid spring.

A further object is to provide an air spring for vehicle suspension wherein admission of air into the spring is controlled by a valve structure which is normally closed as a direct function of pressure differential between the source of fluid pressure and the fluid pressure contained in the spring.

Still a further object is to provide a device of the type described which is actuated by lateral displacement induced by vertical deflection of a portion of the spring relative to the valve.

A still further object is to provide a spring construction of the type described wherein the air spring comprises a cylinder and piston connected by a rolling lobe diaphragm, which piston is formed on and partially surrounds a telescopic shock absorber arranged concentrically within the cylinder.

Yet a further object is to provide a spring construction of the stated character wherein lateral displacement of the air inlet valve is caused by engagement thereof with the side wall of the hydraulic shock absorber.

A yet further object is to provide an air spring of the type described wherein the exhaust valve therefor comprises a port formed in the piston at a level which is overlapped by the diaphragm when the cylinder and piston of the spring are at a desired predetermined displacement, the diaphragm being formed and arranged so that downward deflection of the piston relative to the cylinder causes the port to be uncovered by tre diaphragm and thereby permit escape of fluid from the spring.

These and other objects, advantages, and features of the invention will become more fully apparent as reference is had to the accompanying specification and drawings wherein.

Figure 1:
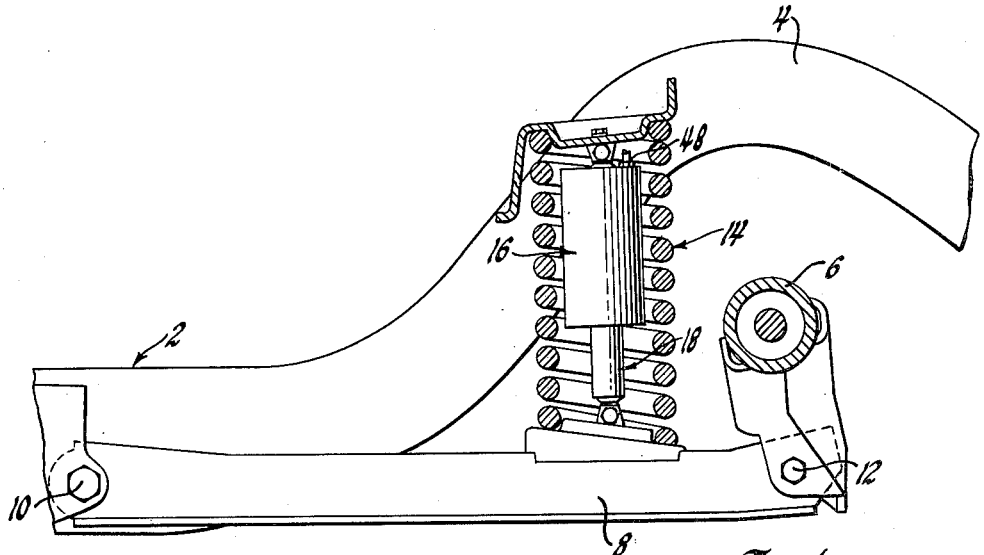
FIG. 1 is a fragmentary side elevational view illustrating a portion of the rear suspension in a vehicle incorporating an air spring in accordance with the invention.

Referring now to the drawings and particularly FIG. 1, the reference numeral 2 designates generally a vehicle frame which includes an upwardly bowed portion 4 overlying the rear axle 6. Axle 6 is articulatably connected to frame 2 by means of a longitudinal link 8 which is pivotally connected at its forward end to frame 2 by a pin joint 10 and at its rearward end to axle 6 by a pin joint 12. Disposed between link 8 and bowed portion 4 is a composite spring assembly 14. Assembly 14 includes an air spring 16 which surrounds and is partly formed by a hydraulic shock absorber 18.

Figure 2:
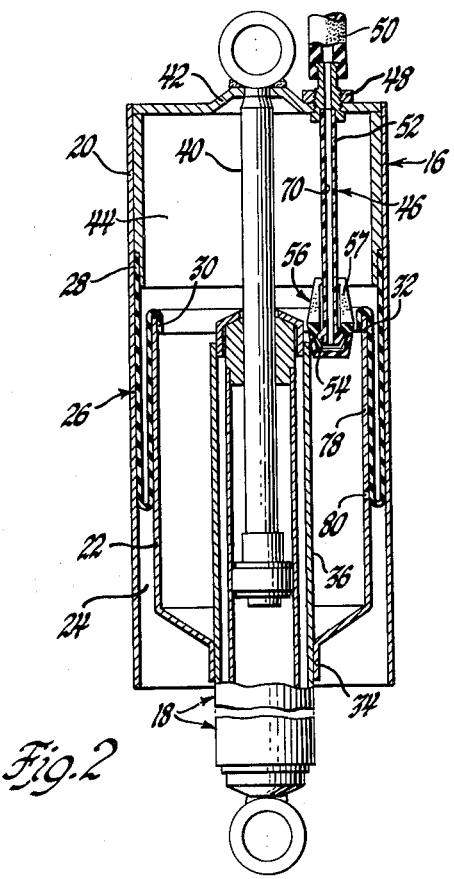
FIG. 2 is an enlarged sectional elevational view illustrating the details of construction of the air spring.

As seen best in FIG. 2, air spring 16 includes an inverted cup-shaped cylinder 20 in which is concentrically disposed a cup-shaped piston 22, the piston being slightly smaller in diameter than the cylinder in order to form an annular interval 24 therebetween. Bridging the annular interval 24 is a relatively thin rolling lobe type diaphragm element 26 which has its outer peripheral edge 28 attached to the side wall of cylinder 20 and its inner edge 30 secured on the upper terminal edge or mouth 32 of piston 22. At its lower end, piston 22 is necked inwardly to form a small diameter sleeve portion 34 which surroundingly embraces the outer wall or casing 36 of a conventional hydraulic shock absorber 18. It will be understood that sleeve 34 is secured to outer wall 36 so as to form a leak proof juncture therebetween. Shock absorber 18 includes a piston rod 40, the upper end of which is welded or otherwise suitably secured to the top wall 42 of cylinder 20. Rod 40 is arranged concentrically within cylinder 20 so that reciprocable movement of casing 36 of shock absorber 18 causes the cup-shaped piston 22 to maintain a uniform annular interval relative to cylinder 20.

Figure 3:
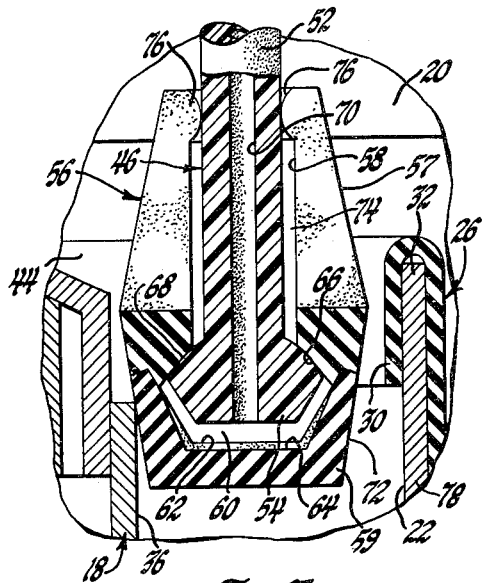
FIG. 3 is a greatly enlarged sectional elevational view of the inlet valve structure.

In accordance with one feature of the invention, the interior space 44 of air spring 16 is supplied with air under pressure by means of an inlet valve assembly 46 which is located entirely interiorly of the spring and which operates as a function of relative displacement between shock absorber casing 36 and spring cylinder 20. As seen in FIG. 2, assembly 46 includes a fitting 48 in spring top wall 42 which is connected by a conduit 50 to any suitable source of air under pressure, not shown. Extending downwardly from fitting 48 is a tubular member 52 having a flanged lower end 54 which is surrounded by a cup closure member 56 having a flask-shaped interior cavity. As seen best in FIG. 3, closure member 56 is formed of a circumferentially segmented upper part 57 and a cup-shaped lower part 59 which are joined together by bonding, cementing or the like. In the preferred form, the parts are formed of Delrin and are joined by a process known as spin welding. In the assembled relation shown, member 56 includes a segmental upper cylindrical bore 58 which merges with a generally conical lower cavity 60 surrounding flange 54 of tubular member 52. Cavity 60 is somewhat larger in diameter than flange 54 and has a flat bottom wall 62 formed with one or more grooves 64, the purpose of which will be described shortly. At its upper end, cavity 60 is formed with a semispherical seat 66 which sealingly engages a corresponding semi-spherical seat 68 formed on the top wall of flange 54. It will be evident that under normal conditions, air under pressure introduced through the passage 70 of tube 52 from the source of pressure previously mentioned will exert a downward force on closure 56, causing seat 66 to firmly engage seat 68 and thereby seal cavity 60, thus preventing emergence of air from the cavity into the interior 44 of the air spring. However, upon upward deflection of shock absorber casing 36, the tapered lower outer periphery 72 of closure 56 will be engaged by casing 36 and laterally displaced relative to tube 52. As a result of such displacement, sealing engagement between seats 66 and 68 is disturbed sufficiently to allow emergence of air under pressure from cavity 60 upwardly through the annular interval 74 between bore 58 and tube 52 into cavity 44. Such flow of air will naturally continue until pressure in spring 16 is sufficient to restore the relative displacement of cylinder 20 and shock absorber casing 36 to a distance where the latter no longer engages closure 56 whereupon air pressure in passage 70 of tube 52 will center closure 56 and restore sealing engagement between seats 66 and 68. To assure prompt and positive centering of closure 56, the segmented upper end 57 thereof is formed with a plurality of semi-spherical contact bosses 76 which bear against the wall of tube 52. It will be evident that bosses 76 will also assure prompt and positive dislocation of sealing engagement between seats 66 and 68 when closure 56 is engaged by casing 36. Since the closure might also be translated axially along tube 52 until the bottom wall 62 engages the lower end of the tube, groove 64 previously mentioned prevents any possibility of inadvertent blocking of flow when the seal between seats 66 and 68 is broken.

To allow exhausting of air from the spring in accordance with the invention, a vertically intermediate point on the piston side wall 78 is formed with an aperture or port 80. Aperture 80 is normally overlapped by the lobe portion 82 of diaphragm 26 so that no movement of air from the spring to atmosphere occurs as long as the desired relative displacement of the piston and cylinder is maintained. However, any appreciable downward movement of piston 22 relative to cylinder 20 results in the diaphragm peeling off the wall of the piston onto the wall of the cylinder and thereby uncovering port 80, whereupon air within the spring is free to exhaust to atmosphere until the pressure in the spring has been reduced sufficiently to restore the normal relative displacement of the piston and cylinder.

The axial position of both valves in relation to vehicle height is predetermined in order to provide a "dead" space in vehicle height where neither exhaust or inlet valve is open and no air flow takes place. The size of the dead space, exhaust port, and the flow orifice in the air supply line determines the required air supply without the use of complex time delay valve in the system.

The tubular member is preferably made flexible so that overtravel and manufacturing tolerances requiring more deflection of the closure than can be allowed by the annular inteval 74 is accommodated by flexing the tube 52.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. A self-leveling air spring comprising, in combination, a cylinder and piston connected by a flexible diaphragm, an air inlet tube extending through said cylinder and projecting into said spring in the direction of deflection thereof, a slidable and rockable check valve surrounding the end of said tube and normally urged to a tube closing position responsive to air pressure in said tube, and means on said piston movable therewith in a path parallel with said tube, said means being effective after predetermined compression deflection of said spring to rockably displace said valve relative to said tube and thereby permit air pressure in said tube to enter said spring.

2. A self-leveling air spring comprising, in combination, a cylinder and piston connected by a flexible diaphragm, a high pressure air inlet tube extending through said cylinder and projecting into said spring in the direction of deflection thereof, a flared end on said tube, a check valve surrounding the end of said tube and normally urged to a tube closing position responsive to air pressure in said tube, said check valve having a generally flask-shaped interior, a portion of which forms a seat engageable with a corresponding seat on said flared end of said tube, a telescoping shock absorber arranged concentrically within said piston, said absorber casing being movable with said piston and having a portion thereof engageable with the outer surface of said check valve after predetermined compression deflection of said spring, and means on the outer surface of said check valve forming a cam surface whereby said check valve is displaced transverse of said tube sufficient to disturb the tube closing position of said valve and thereby permit air pressure in said tube to enter said spring.

3. In an air spring, an inlet valve assembly comprising, a depending tubular member having an annular flared portion at the lower end thereof, a closure surrounding said tube, said closure having a flask-shaped interior including an enlarged lower cavity surrounding said flared end, said lower cavity having a generally flat closed bottom and an upper annular wall portion defining a seat engageable with a corresponding seat formed on the upper surface of said flared portion, and means defining a transverse groove in said flat bottom preventing total blocking of said tubular member when the latter is abuttingly engaged by said closure bottom.

4. In an air spring, an inlet valve assembly comprising, a depending semi-rigid tubular member having an annular flared portion at the lower end thereof, the upper surface of said flared portion defining a semi-spherical seat, a closure surrounding said tube, said closure including an upper portion having a cylindrical passage surrounding said tube and a lower portion defining an enlarged cavity surrounding said flared end, said cavity having a generally flat closed bottom and an upper annular wall portion defining a semi-spherical seat engageable with said first mentioned seat on the upper surface of said flared portion, and means defining a transverse groove in said flat bottom preventing total blocking of said tubular member when the latter is abuttingly engaged by said closure bottom.

5. In an air spring, an inlet valve assembly comprising, a depending tubular member having an annular flared lower end, a flash-like closure surrounding said tube, said closure having an upper cylindrical bore spaced from said tubular member merging with an enlarged lower cavity surrounding said flared end, a bottom wall in said closure closing the lower end of said cavity, means forming a plurality of radially inwardly projecting bosses on the upper end of said closure providing bearing engagement with said tubular member, and means forming seats on the upwardly facing surface of said flared end and downwardly facing surface of said cavity.

6. In an air spring, an inlet valve assembly comprising, a depending semi-rigid tubular member having an annular flared lower end, a closure surrounding said tube, said closure having an upper cylindrical bore spaced from said tubular member merging with a lower cavity surrounding said flared end, a bottom wall in said closure closing the lower end of said cavity, means forming a plurality of semi-spherical bosses projecting radially inwardly from the upper end of said cylindrical bore providing bearing engagement with said tubular member, cooperating semi-spherical seats formed on the upwardly facing surface of said flared end and downwardly facing surface of said cavity, and a transverse groove formed in the bottom wall of said closure.

7. The structure set forth in claim 6 wherein said closure is formed of plastic material.

8. The structure set forth in claim 6 wherein said closure is formed of two plastic parts joined together in a plane through said lower cavity perpendicular to the axis of said cylindrical bore.

9. A self-leveling air spring comprising, an inverted cup-shaped cylinder, a cup-shaped piston arranged in telescoping relation with said cylinder with an annular interval therebetween, a rolling lobe diaphragm connected to said cylinder and piston closing said annular interval, said diaphragm having depending wall portions overlapping the adjacent walls of said cylinder and piston, an air inlet tube extending through said cylinder and projecting into the spring in a direction parallel with the path of movement of said piston, said tube having a flared end formed with a semi-spherical seat on the upper surface thereof, a flask-like closure surrounding said tube and flared end, said closure having a lower cavity formed with a semi-spherical seat sealingly engageable with said first mentioned seat responsive to air pressure in said tube acting on said closure, said closure having a tapered outer periphery, means associated with said piston engageable with said tapered periphery upon predetermined compression deflection of said piston to rockably displace said closure relative to said tube and thereby disturb the seal formed by said seats to allow air to enter said spring from said tube, and a port formed in the wall of said piston normally overlapped by one of said diaphragm wall portions, said port being uncovered upon predetermined rebound deflection of said piston to allow exhausting of air from said spring.

10. In combination, a coil spring, a self-leveling air spring disposed concentrically within said coil spring and acting in parallel therewtih, said air spring comprising an inverted cup-shaped cylinder, a cup-shaped piston arranged in telescoping relation with said cylinder with an annular interval therebetween, a rolling lobe diaphragm connected to said cylinder and piston closing said annular interval, said diaphragm having depending wall portions overlapping the adjacent walls of said cylinder and piston, a semi-rigid air inlet tube extending through said cylinder and projecting into the spring parallel with the path of movement of said piston, said tube having a flared end formed with a semi-spherical seat on the upper surface thereof, a flask-like closure surrounding said tube and flared end, said closure having an upper cylindrical bore surrounding said tube in spaced relation therefrom, said bore merging with a lower cavity having a downwardly facing semi-spherical seat sealingly engageable with said first mentioned seat responsive to air pressure in said tube acting on said closure, said closure having a frustoconical outer periphery, a shock absorber having a casing secured to said piston, said casing having a straight wall portion engageable with said frusto-conical periphery upon predetermined compression deflection of said piston to rockably displace said closure relative to said tube and thereby disturb the seal formed by engagement of said seats to allow air to enter said spring from said tube, and a port formed in the wall of said piston normally overlapped by one of said diaphragm wall portions, said port being uncovered upon predetermined rebound deflection of said piston to allow exhausting of air from said spring.

References Cited in the file of this patent

UNITED STATES PATENTS

| | | |
|---|---|---|
| 1,457,157 | Galbraith | May 29, 1923 |
| 2,916,298 | McMullin | Dec. 8, 1959 |
| 2,922,635 | DeLorean | Jan. 26, 1960 |